(12) United States Patent
Dewhirst et al.

(10) Patent No.: US 7,731,593 B2
(45) Date of Patent: Jun. 8, 2010

(54) COMPOSITE TRANSMISSION SHAFT JOINT

(75) Inventors: Michael James Dewhirst, Northants (GB); Roger Davidson, Abingdon (GB)

(73) Assignee: Crompton Technology Group Ltd., Banbury (GB)

( * ) Notice: Subject to any disclaimer, the term of this patent is extended or adjusted under 35 U.S.C. 154(b) by 902 days.

(21) Appl. No.: 11/384,339

(22) Filed: Mar. 21, 2006

(65) Prior Publication Data
US 2006/0258469 A1 Nov. 16, 2006

(30) Foreign Application Priority Data
Mar. 22, 2005 (DE) .................................. 0505806

(51) Int. Cl.
*F16D 1/068* (2006.01)
(52) U.S. Cl. ...................... 464/181; 464/182
(58) Field of Classification Search ......... 464/181–183; 156/153, 154, 169, 172, 173, 175
See application file for complete search history.

(56) References Cited

U.S. PATENT DOCUMENTS

| | | | | | |
|---|---|---|---|---|---|
| 4,238,539 | A | * | 12/1980 | Yates et al. | 464/181 |
| 4,605,385 | A | * | 8/1986 | Puck et al. | 464/181 |
| 4,706,364 | A | * | 11/1987 | Aubry | 464/181 |
| 4,952,195 | A | * | 8/1990 | Traylor | 464/181 |
| 5,318,374 | A | * | 6/1994 | Rumberger | 464/182 |
| 5,443,099 | A | * | 8/1995 | Chaussepied et al. | |
| 5,447,390 | A | * | 9/1995 | Sparks et al. | |
| 6,350,204 | B1 | * | 2/2002 | Yasui et al. | 464/181 |
| 6,361,080 | B1 | * | 3/2002 | Walsh et al. | |
| 6,682,436 | B2 | * | 1/2004 | Kimoto et al. | 464/181 |
| 6,692,365 | B2 | * | 2/2004 | Suzuki et al. | 464/181 |
| 6,698,078 | B2 | * | 3/2004 | Prucher | |
| 2003/0207715 | A1 | | 11/2003 | Sugiyama et al. | |
| 2004/0190976 | A1 | * | 9/2004 | Mermoz | 464/182 |

FOREIGN PATENT DOCUMENTS

| | | |
|---|---|---|
| DE | 39 36 999 A1 | 5/1990 |
| GB | 2 026 651 A | 2/1980 |
| GB | 2 071 812 A | 9/1981 |
| GB | 2 207 732 A | 2/1989 |

OTHER PUBLICATIONS

GB Search Report dated Jul. 11, 2005.

* cited by examiner

*Primary Examiner*—Greg Binda
(74) *Attorney, Agent, or Firm*—Crowell & Moring LLP

(57) ABSTRACT

A fiber reinforced composite shaft bearing a metallic flanged end coupling (Fl) attached to the outside diameter through a concentric cylindrical torsional joint, comprising:
 a) a cylindrical end region comprising a wedge shaped inner layer of fiber (Hp) composite;
 b) a layer of outer helical composite plies (He) forming the shaft and extending over the wedge shaped inner layer, wherein the layer of outer helical plies has a tapered end part overlying wedge shaped inner layer to form the cylindrical end portion, wherein all helical plies of fibre layers are exposed on an outer surface; and
 c) a metallic flanged end coupling attached to the outer surface of the cylindrical end region through a primary mechanically interface (Sp) which may be splined.

The joint may be strengthened by internally reinforcing the main shaft with an interference fit tubular plug (Pg) and protected from environmental degradation by inboard secondary adhesive bond (Ad).

13 Claims, 5 Drawing Sheets

COMPOSITE TRANSMISSION SHAFT JOINT

FIELD

This invention relates to a means of producing a lightweight composite transmission shaft with metallic end fittings attached through a splined mechanical interface in each joint end.

BACKGROUND OF THE INVENTION

Composite shafts for use in torque carrying, power transmission applications are highly dynamic as in motor propshafts, marine shafts, aircraft flap shafts, helicopter drive shafts, industrial drive shafts, wind turbines and dynamometers. They are required to have good torsional, static and fatigue strength coupled with a high whirling resistance. To achieve the latter, low shaft densities, large diameters, reduced length and high longitudinal modulus are all advantageous characteristics. However, for any specific design application the lengths and diameters of the shafts are fixed. A material combination with high specific axial modulus (high longitudinal modulus and low density) is required to produce a shaft with high resistance to whirling. To achieve this, composite tubes reinforced with high modulus fibres and in particular high modulus carbon fibre reinforced plastics (CFRP) are the materials of choice. Torque is transferred through flanged end fittings attached to the shaft ends. A structurally efficient design of this joint mechanism is the subject of this invention.

Fiber reinforced composite shafts exhibit advantages over metallic shafts, i.e., they are lighter in weight, more resistant to corrosion, stronger, and more inert. Fibre reinforced drive shafts comprising both glass fibers and carbon fibers in a resinous matrix have been disclosed in U.S. Pat. No. 4,089,190, "Carbon Fiber Drive Shaft" by Worgan and Reginald. Tubular fibre reinforced composites have been proposed, as demonstrated by U.S. Pat. No. 2,882,072 issued to Noland on Apr. 14, 1959, and U.S. Pat. No. 3,661,670 issued to Pierpont on May 9, 1972, and in British Pat. No. 1,356,393 issued on Jun. 12, 1974. Vehicle drive shafts from tubular fiber reinforced composites, as demonstrated by U.S. Pat. No. 4,041,599 issued to Smith on Aug. 16, 1977, and to Rezin and Yates (Celanese Corporation) in U.S. Pat. No. 4,171,626. Here the filaments bearing an uncured thermosetting resin are wound around a mandrel until the desired thickness has been established, whereupon the resinous material is cured. Zones or layers are positioned circumferentially within the wall of the shaft in the specific angular relationships there disclosed. The transmission of torque into the composite shaft through mechanical and adhesive joints is the subject of a series of further Celanese U.S. patents granted in 1980-1981: U.S. Pat. Nos. 4,185,472, 4,187,135, 4,214,932, 4,236,386, 4,238,539, 4,238,540, 4,259,382 and 4,265,951. Mechanical fixing of a tubular composite shaft through an internally fitted tubular metallic splined interface is described in JP2001065538 by Manabu et al (Mitsubishi Motors Corp.)

Composite shafts can be manufactured in a variety of ways. Filament winding allows combinations of winding helix angles, ply thicknesses and fibre type to be used in optimised lay ups. The main shaft may be made from fibrous reinforcement in a polymeric matrix. The fibres may be based on carbon, glass, ceramic or high stiffness polymer filaments or from hybrid mixes of these fibrous forms. The matrix may be based on thermosetting polymers such as epoxy or for high temperature applications polyimide or bismaleimides. Production methods can be based on laying combinations of low angle helical, higher angle, helical and hoop oriented layers distributed throughout the tube thickness to give combinations of controlled wall section, torsional and longitudinal stiffness and strengths commensurate with the design requirements. The composite tube properties are tailorable through control of the relative thickness of the plies and angles relative to the axis of the shaft. Fibres wound at low angles <30° impart high axial tensile properties; fibres wound at 40-50° impart high torsional properties; fibres wound at 75-89° impart high hoop properties.

OBJECT OF THE INVENTION

The present invention relates to the modification of the composite laminate in the end regions of the main shaft over which the load is to be transferred between the composite and the flanged end fitting such that the load will be evenly distributed into the torque bearing plies of the tube.

SUMMARY OF THE INVENTION

The present invention relates to the means of forming a lightweight structural connection between a fibre reinforced composite shaft and metallic end flanged coupling. The attachment is made to the outside diameter of the composite through a concentric cylindrical torsional joint which consists of a primary mechanical joint which may incorporate serrated splined internal features and is designed to be able to withstand both high torsional and axial tensile and compressive loads and is not reliant on an adhesively bonded joint. The design also allows the optional use of a secondary load path accommodated through structural adhesive bond which also forms a protective barrier in the jointed region against the operational environment. This design philosophy is very important in aerospace shafts where NDT methods are not able to determine accurately the integrity of a bonded joint. This makes primary adhesive joints unacceptable in many aerospace applications.

The present invention relates to the modification of the composite laminate in the end regions of the main shaft over which the load is to be transferred between the composite and the flanged end fitting such that the load to be evenly distributed into the torque bearing plies of the tube. This is achieved by using a wedge shaped inner layer of high angle hoop fibre to control the local through thickness geometry of the outer helical plies such that after a simple machining operation on the outer surface of the composite tube in the end regions, the plies through the tube wall thickness are projected onto the surface of the tube. The primary load transfer mechanism is then made through an external interference fit with the modified surface of the composite tube and a metallic fitting which may incorporate serrated splined internal features. This forms a mechanical interface with each helical ply layer.

An optional secondary load path can also be accommodated through an in-board adhesive bond to the outside diameter of the composite. The ends of the bonded region are designed to accommodate adhesive fillets which reduce stress concentrations at the ends of the stressed joint. The presence of the adhesive gives both increased stability to the joint and acts as a sealant to encase all of the exposed fibres on the end face of the tube and serves to protect the exposed fibres from the environment.

The present invention accordingly provides an apparatus as defined herein.

BRIEF DESCRIPTION OF THE DRAWINGS

Certain embodiments of the invention will now be described, by way of examples only, with reference to the accompanying drawings, which.

DETAILED DESCRIPTION OF THE INVENTION

Figure 1:
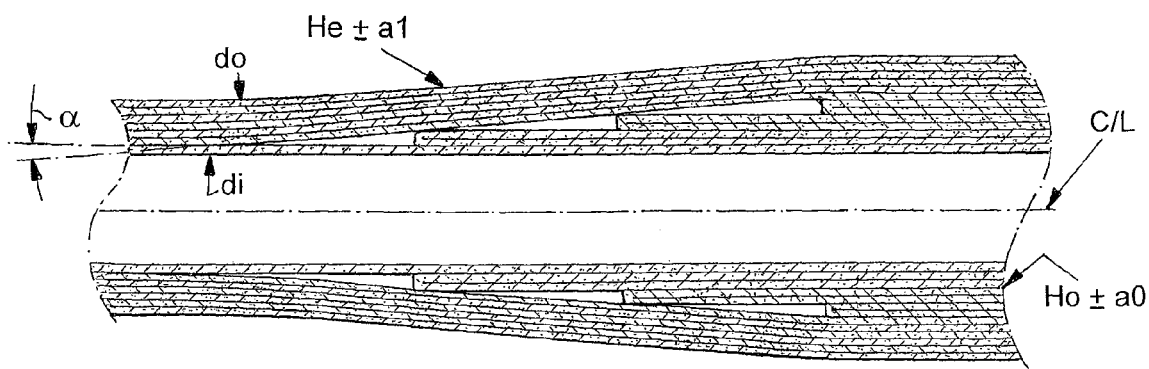
FIG. 1 is a view of the as-wound end of a filament wound composite tube which forms the basis of the main shaft.

FIG. 1 shows a composite tube illustrating impregnated fibre layers wound on a former mandrel to form a shaft according to the embodiment of the invention. The main shaft composite construction consisting of a multiplicity of layers of reinforcement at distinct winding angles ($\pm a1$, $\pm ao$) to form the main shaft wall. The fibre reinforcement in each layer may be of the same type or may vary between the layers to allow a wider range of tailorable properties of the composite tube to be achieved. FIG. 1 illustrates a two angle, construction, however, any number of layers and winding angles may be used in practice such that the required mechanical properties of the main shaft with inside diameter (di), outside diameter (do) and total composite wall thickness (tc) is built up. The thin inner layer (Ho) is wound at +ao to the axis C/L. The angle ao is preferably 85-89.5° so that the fibre of the layer Ho are close to a hoop orientation as are the end regions which are wound at $\pm ao$ in a number of layers of differing lengths to give a distinct taper angle of $\alpha$ with respect to the axis C/L. The outer helical layers (He) are wound over the mandrel length producing a build up, of composite thickness over the end regions.

Figure 2:
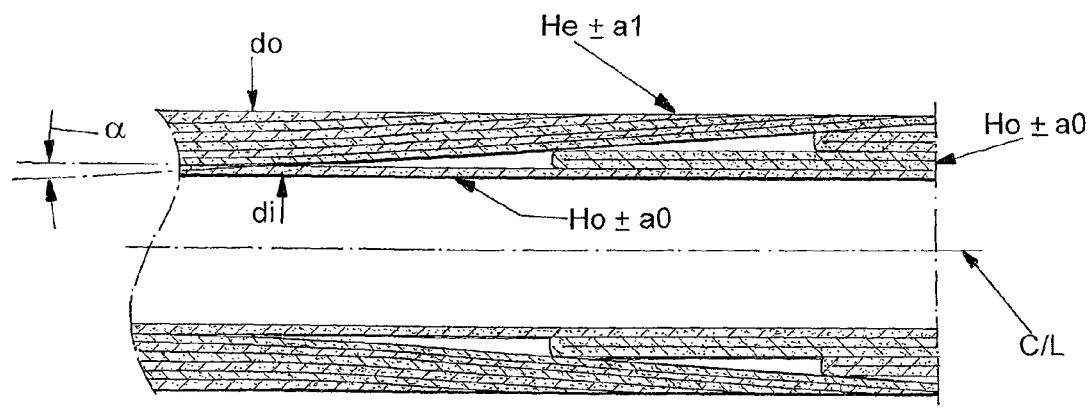
FIG. 2 shows the end of the composite main shaft after machining of the end region.

The various fibre layers are impregnated with uncured resin and laid as shown in FIG. 1. The resin is then cured by any known method. After curing the matrix of fibre layers and resin to a composite material, the tube is cut to length and the ends of the composite are machined to give a parallel end section as shown in FIG. 2. This machining operation cuts through and projects the edges of the helical plies running over the hoop wedge region of length Lw. The exposed edges of all of the helical layers in the machined cylindrical hoop wedge region (Lw) produces an optimized surface though which torsional stresses can be transferred without premature shearing of individual helical layers.

Figure 3:
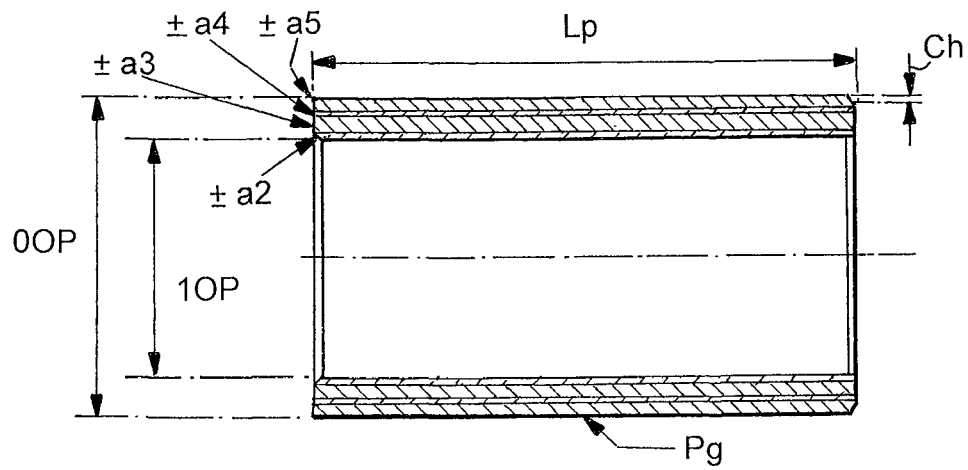
FIG. 3 shows the details of a hoop stiffened composite end plug which is designed to be push fitted into the ends of the main shaft.

FIG. 3 shows the construction of composite end plugs (Pg) which are formed onto a mandrel of diameter IDp in a multiplicity of filament wound layers of reinforcement at distinct winding angles ($\pm a2$, $\pm a3$). The fibre reinforcement in each layer may be of the same type or may vary between the layers to allow a wider range of tailorable properties of the composite tube to be achieved. FIG. 3 illustrates a four-layer construction, however, any number of layers and winding angles may be used in practice to give the required balance of hoop to axial stiffness and strengths. The plugs are machined to length (Lp) and on their external diameter (ODp) to give a light interference fit with the inner diameter of the main shaft. One end is lightly chamfered (Ch) at the outer diameter to enable the subsequent insertion into the end of the main shaft.

Figure 4:
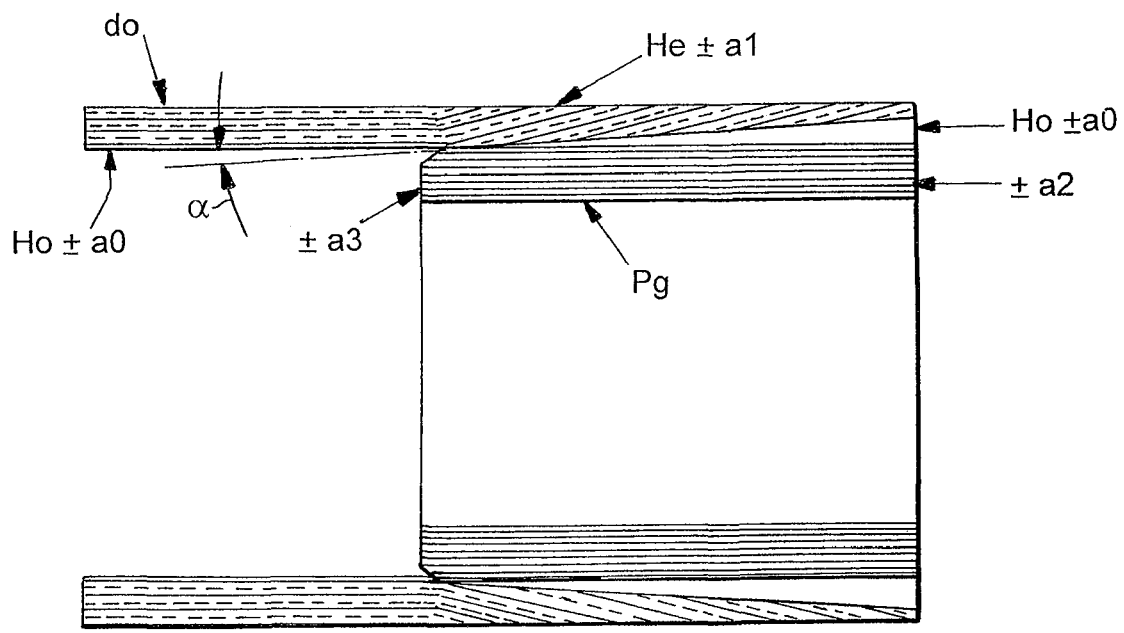
FIG. 4 shows the composite inner cylinder interference fit.

FIG. 4 shows one end of the main shaft with the plug (Pg) inserted just past the wedge length distance (Lw). The plug increases the hoop stiffness and strength of the end regions to prevent material in the main shaft wall buckling during the subsequent interference fitting of the metallic ends. The interference fit of the plug makes it possible to put equal and opposite radial forces through the torque carrying element of the tube from the plug as the assembly of a serrated fitting is carried out.

Figure 5A:
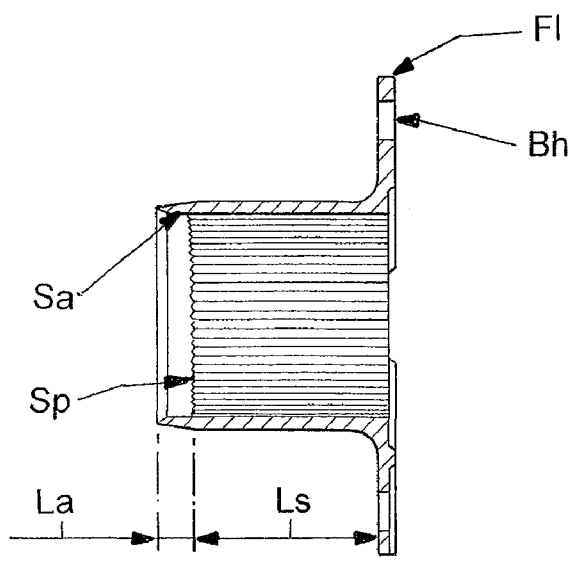
FIGS. 5a-c shows the details of an internally splined metallic end coupling.
Figure 5B:
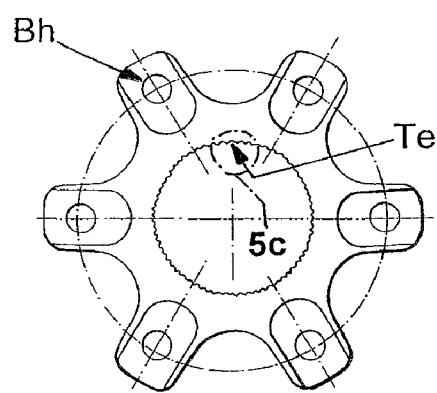
Figure 5C:
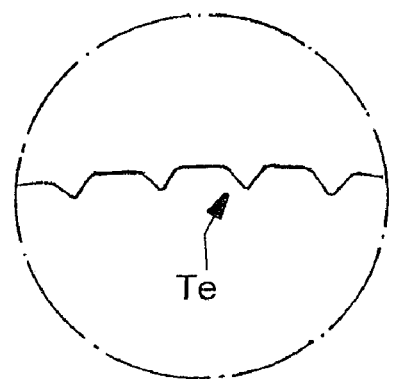

FIG. 5a-c shows details of the metallic end fittings. FIG. 5a shows a longitudinal section of the splined end fitting. FIG. 5b shows an end view of the flange and FIG. 5c shows the details of the splined teeth. The fittings consist of an internally splined region (Sp) of length Ls, a cylindrical unsplined region (Sa) of length La, a flange region (Fl) containing a number of bolt holes (Bh), distributed evenly around a common pitch circle diameter, through which the torque can be transmitted into and out of the shaft. FIG. 5b shows a flange with six boltholes; however, any number of holes may be used depending on the stresses to be transmitted. The spline consists of a multiplicity of teeth (Te) with inner diameter just less than the machined outer diameter of the main shaft. A particular design of teeth is shown in FIG. 5c. The teeth points at the inner diameter subtend an angle around 90'; the spline shape at the outer diameter is smoother. Combined together these features give low torsional stress concentrations in the metallic splined joint.

Figure 6A:
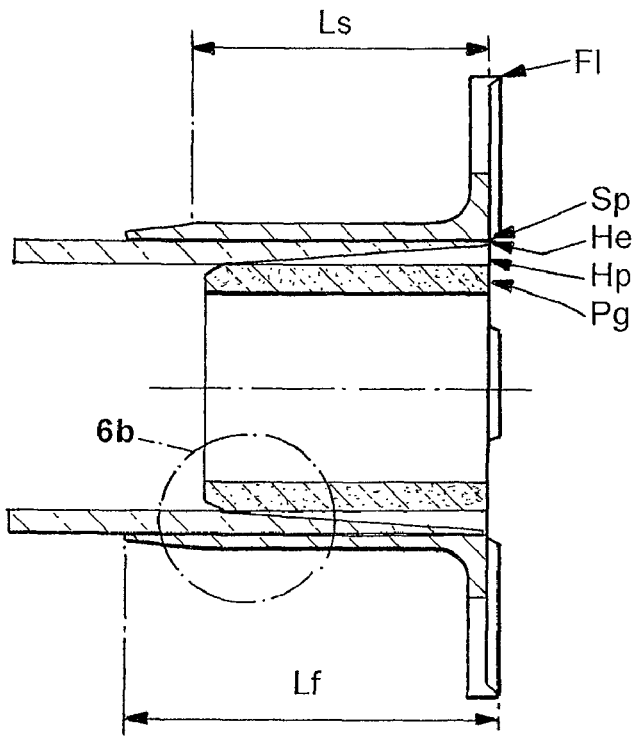
FIG. 6 shows a section of the main shaft with a splined end pushed on and mechanically locked in place through a high interference fit with the serrations of the end fitting.
Figure 6B:
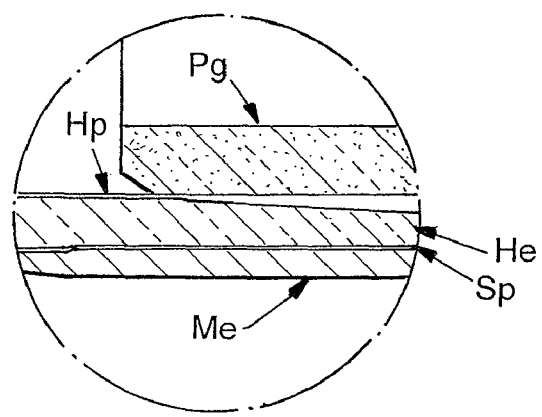

FIG. 6 shows the assembled primary mechanical joint. The spline teeth (Te) have an inner diameter just less than the machined outer diameter of the main shaft such that when the splined metal ends are axially compressed onto the main shaft a matching spline is cut into the composite surface as the heavy interference fit is formed over a length Ls. Ls is designed to be greater than Lw such that mechanical locking to all the main shaft helical plies occurs in order to maximise the strength of the mechanical joint. This end attachment process is inherently self-aligning giving highly concentric outer machined diameter of the main shaft ends and the flanged end fittings. The mechanically interlocked splined length (Ls), number of teeth and their geometry is chosen so that the mechanical interlock is able to support the required ultimate compressive and tensile loads as well as being able to transmit both design static and cyclic torque. The end region (Sa) defined by length La with a small radial clearance remains unbonded in the dry assembly process. When the splined fitting is pressed over the outside it transmits compressive stresses into the shaft walls and this can lead to combined compressive loads and torsional loads in the shaft during use which could reduce the torque carrying capacity of the part. By optimising the interference fit of the plug it is possible to put equal and opposite radial forces through the torque-carrying element of the tube from the plug as from the serrated fitting. This means that an extremely high integrity joint can be made without introducing combined hoop and torsional loads into the torque carrying elements of the tube. In order to achieve this it is desirable that the composite plug actually preloads the end of the tube hoopwise by putting in positive hoop stresses so that the negative hoop stresses imposed by the assembly of the end fitting onto the tube cancel these out leaving the helical plies in their ideal state to maximise the torque carrying capacity of the tube.

Figure 7A:
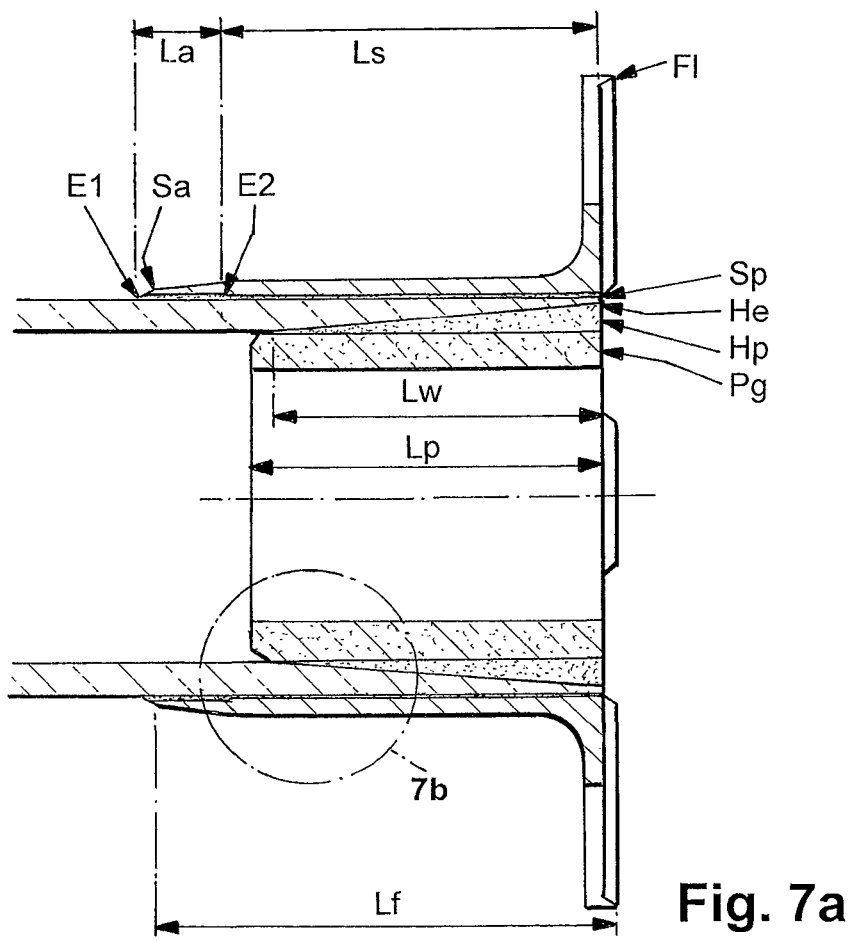
FIG. 7 shows an end cross-section of the assembled shaft with an adhesive bonded joint in board of the mechanical splined joint.
Figure 7B:
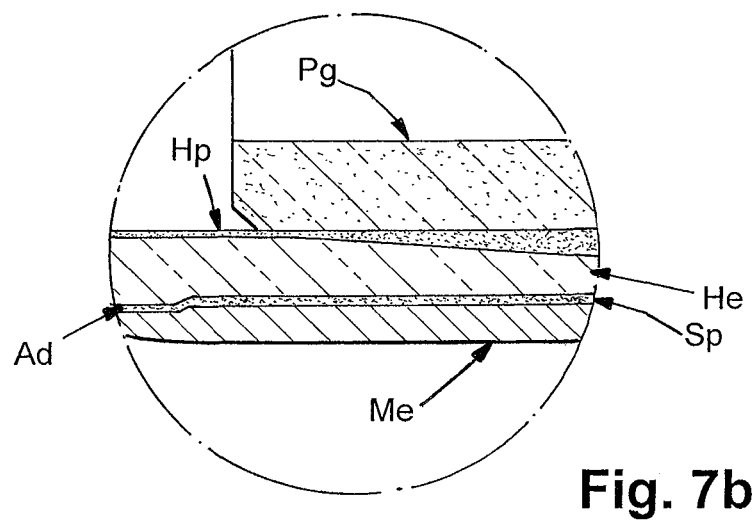

FIG. 7 shows the finished shaft which has been assembled as described above except that a high strength paste adhesive or sealant (Ad) is incorporated into the joint area around the serrated fitting. The adhesive forms a structural joint over the region La between the end fitting and the composite tube through a multiplicity of composite ply interfaces machined in the main shaft wall section (He). This increases the strength of the joint region and also acts to seal the mechanical interface from the long-term effect of the working environment. The adhesively bonded region (La) acts as a secondary load path in the joint. The adhesive can be applied prior to assembly, or it can also be introduced after dry assembly using a vacuum potting technique or an injection process. The adhesive sealant also fills the gaps between the fittings and the machined surface of the composite which adds a radial constraint to the machined surface of the composite preventing the surface of the composite form buckling or peeling away ensuring that the load path for the torsional load is through shear of the composite in contact with the teeth of the spline. The ends of the adjacent joint region E1 and E2 are shaped to accommodate adhesive fillets which act to reduce the stress concentrations at the ends of the adhesive joint. The relative length ratio Ls/La can be adjusted to alter the balance between the stresses carried by the mechanically fixed to adhesively bonded sections of the joint.

As a first example of an embodiment of the invention the properties of a composite transmission shaft will now be illustrated based on sizes and ply orientations suitable for an aircraft wing flap lift shaft application. Here 30,000 cycle fatigue torques of up to ±245 Nm and rotation speeds of 1300 rpm are a typical test requirement. The dimensions of the composite shaft would have an outside diameter of 33 mm with an internal diameter of 27.7 mm and length of 1.75 m. Axial compressive loads in excess of 7 kN can be supported with less than 5 mm transverse deflection. To achieve this, the central lay up of the main shaft would be ±28° in a 2.45 mm thick layer overlying an inner layer of fibres wound at +89° in a 0.2 mm thick layer. Standard grade carbon fibre is used throughout. An epoxy bisphenol A resin with an anhydride curing agent would typically be used as the matrix resin. This is used to impregnate the fibre tows prior to laying down onto the mandrel. The longitudinal modulus of this construction is >50 GPa and the composite density is ~1560 kgm-3. The taper angle of the end region is machined to 4.9° with respect to the shaft axis to project the edges of the through thickness plies.

The hoop stiffened end plugs are wound using similar processes and materials to those used in the main tube. The tubular plugs are wound (±89° (0.75 mm) ±20° (0.35 mm))2 to give a 21.3 mm as moulded internal diameter with the outer diameter machined to 27.7 mm to give an light interference fit with the internal diameter of the main shaft. These tubes are push fit into the main shaft ends to a distance of 35 mm and the protruding ends of the plug are machined back to match the ends of the main shaft.

The metallic sleeve would typically be based on a 1.35 mm thick thin walled high strength steel with an internal diameter of 33.4 mm of length 38 mm. The internal surface of the end fitting has 68 teeth with a spline length of 31 mm and an inboard length of 6 mm. The two spline ends are simultaneously pushed onto the composite main shaft through the application of a compressive load of 30-40 kN. This creates a heavy interference and in so doing cuts fine splined grooves into the external surface of the shaft. Testing of the serrated mechanical interface so produced without any secondary bonding has shown that the mechanical joint is able to support torsional loads of in excess of 1200 Nm and tensile loads in excess of 25 kN.

A second embodiment of the invention consists of a similar primary joint as cited in the first example except that during the mechanical assembly process an epoxy paste adhesive is incorporated into and spread around both the 31 mm long mechanical interface defined by Ls and the 6 mm long region defined by La along which a 0.15 mm thick adhesive layer can be accommodated to protect the jointed area from the environment and optimise the bond performance. The incorporation of the secondary load path enabled enhanced torsional strengths in excess of 1300 Nm and higher tensile loads in excess of 30 kN to be supported. The adhesive also seals the ends and machined surfaces of the shaft in the joint region.

Although the invention has been described in connection with a preferred embodiment thereof, it will be appreciated by those skilled in the art that additions, modifications, substitutions and deletions not specifically described may be made without departing from the spirit and scope of the invention as defined in the appended claims. As such this invention is not restricted to the details of the foregoing example.

The invention claimed is:

1. A fibre reinforced composite shaft comprising a composite tube formed from layers of reinforcing fibre impregnated with a resin matrix, and a metallic end coupling having a splined inner surface attached to the outside surface of a cylindrical end region of the tube, said cylindrical end region comprising a wedge shaped inner portion tapering away from the end of the shaft and comprising further layers of reinforcing fibre impregnated with a matrix material, and a wedge shaped outer portion comprising said layers of reinforcing fibre forming the tube and extending over the wedge shaped inner portion; wherein:

the wedge, shaped outer portion is tapered towards the end of the shaft and overlies the wedge shaped inner layer to form the cylindrical end region;

the respective layers of the outer wedge portion are each exposed on the outer surface of the cylindrical end region;

the end coupling is joined to the outer surface of the cylindrical end region through said splined inner surface, enabling transfer of torsional, axial tensile and compressive loads from the end coupling directly to each respective fibre layer of the tube exposed on the outer surface of end region.

2. The fibre reinforced composite shaft according to claim 1, wherein the tube comprises a further inner layer of wound fibre impregnated with a matrix material, extending over the length of the tube and laid at a high helical angle.

3. The fibre reinforced composite shaft according to claim 1, wherein said further layers forming the wedge shaped inner portion comprise layers of wound fibre laid at a high helical angle.

4. The fibre reinforced composite shaft according to claim 3, wherein the high helical angle is in the range 75-89.9° with respect to the axis (C/L) of the shaft.

5. The fibre reinforced composite shaft according to claim 4 wherein the high helical angle is in the range 85-89.9° with respect to the axis (C/L) of the shaft.

6. The fibre reinforced composite shaft according to claim 1, further comprising a tubular plug located within the cylindrical end region, for increasing the hoop stiffness and strength of the cylindrical end region and for preventing the material of the cylindrical end region from buckling during interference fitting of the metallic flanged end coupling.

7. The fibre reinforced composite shaft according to claim 6 wherein the plug is coterminous with the cylindrical end region.

8. The fibre reinforced composite shaft according to claim 6, wherein the plug comprises a multiplicity of filament wound layers of fibre reinforcement at distinct winding angles, and the plug gives a light interference fit with an inner diameter of the cylindrical end region.

9. The fibre reinforced composite shaft according to claim 8, wherein at least two of said filament wound layers are of differing fibre reinforcement material.

10. The fibre reinforced composite shaft according to claim 1, further comprising an adhesive bond between the outside surface of the cylindrical end region and the metallic end coupling.

11. The fibre reinforced composite shaft according to claim 10 where the metallic end coupling is shaped at its end to receive adhesive.

12. The fibre reinforced composite shaft according to claim 1, wherein the wedge shaped outer portion comprises at least two fibre layers wound at differing helical angles.

13. The fibre reinforced composite shaft according to claim 1, wherein the wedge shaped outer portion comprises at least two fibre layers which are formed from respective different fibre reinforcement materials.

* * * * *